United States Patent
Frantz et al.

(10) Patent No.: US 12,208,741 B2
(45) Date of Patent: Jan. 28, 2025

(54) AUGMENTED MACHINE USER INTERFACE SYSTEM

(71) Applicant: Caterpillar Paving Products Inc., Brooklyn Park, MN (US)

(72) Inventors: Matthew-David S. Frantz, Eden Prairie, MN (US); Eric Engelmann, Delano, MN (US); Dario Sansone, Bologna (IT); Gianfranco Perri, Bologna (IT); Elizabeth R. K. Brockman, Charlotte, NC (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 105 days.

(21) Appl. No.: 17/827,062

(22) Filed: May 27, 2022

(65) Prior Publication Data

US 2023/0382305 A1 Nov. 30, 2023

(51) Int. Cl.
*G06T 19/00* (2011.01)
*B60R 1/27* (2022.01)
*G06T 17/00* (2006.01)
*E01C 23/088* (2006.01)
*H04N 23/90* (2023.01)

(52) U.S. Cl.
CPC .............. *B60R 1/27* (2022.01); *G06T 17/00* (2013.01); *G06T 19/006* (2013.01); *B60R 2300/102* (2013.01); *B60R 2300/302* (2013.01); *E01C 23/088* (2013.01); *G06T 2200/24* (2013.01); *H04N 23/90* (2023.01)

(58) Field of Classification Search
None
See application file for complete search history.

(56) References Cited

U.S. PATENT DOCUMENTS

| | | | | |
|---|---|---|---|---|
| 8,228,348 | B2 * | 7/2012 | Kimpe | G09G 3/2092 |
| | | | | 382/128 |
| 9,466,158 | B2 * | 10/2016 | Elnajjar | G07C 5/12 |
| 9,797,100 | B1 | 10/2017 | Caterpillar | |
| 9,896,810 | B2 | 2/2018 | Wirtgen | |
| 10,543,782 | B2 | 1/2020 | Caterpillar | |
| 10,875,452 | B2 * | 12/2020 | Omiya | H04N 5/265 |
| 10,913,396 | B2 * | 2/2021 | Diedrich | B60R 1/08 |
| 2010/0110185 | A1 * | 5/2010 | Tafazoli Bilandi | H04N 7/183 |
| | | | | 455/39 |
| 2016/0137125 | A1 | 5/2016 | Caterpillar | |
| 2017/0061689 | A1 | 3/2017 | Caterpillar | |
| 2017/0330034 | A1 * | 11/2017 | Wang | G05D 1/0088 |
| 2021/0299807 | A1 | 9/2021 | Caterpillar | |
| 2022/0018097 | A1 * | 1/2022 | Kurosawa | G05D 1/0005 |
| 2022/0251806 | A1 * | 8/2022 | Otoh | E02F 9/24 |

FOREIGN PATENT DOCUMENTS

EP 4159933 A1 * 4/2023 ............. E02F 3/435

* cited by examiner

*Primary Examiner* — Saptarshi Mazumder

(57) ABSTRACT

A method and system for generating an augmented machine view. The augmented machine view may include a dynamic virtual machine model representing an actual working machine, overlayed with camera footage from around the working machine. The dynamic virtual machine model may be synched in time with the camera footage. The system for generating the augmented machine view may include cameras mounted on the actual machine and machine sensors monitoring the position and movements of individual components of the machine.

17 Claims, 16 Drawing Sheets

AUGMENTED MACHINE USER INTERFACE SYSTEM

TECHNICAL FIELD

The embodiments described herein are generally directed to equipment operator interfaces, and, more particularly, to combining real-time camera views of a machine environment with a dynamic virtual model of the machine.

BACKGROUND

Operation of certain large mobile equipment requires monitoring and adjusting various parts of the mobile equipment. These parts of the mobile equipment may be located considerable distances from one another, such that an equipment operator is required to walk around, and/or climb on, the mobile equipment in order to view and control the operation of the parts, in turn. Some mobile equipment requires multiple operators to keep track of different parts of the equipment.

Mobile equipment may include one or more cameras positioned and mounted to capture video of one or more areas around the mobile equipment. An operator can use video from the cameras to view various areas around the machine. However, current camera display systems may offer limited views of the functioning of mobile equipment itself, and especially the interaction between the working mobile equipment and its environment, as captured by the cameras. Thus, the operator or operators may be required to (i) watch both the camera view(s) on a display screen and the mobile equipment in real life and (ii) keep physically moving around the mobile equipment to observe the functionality of different portions of the mobile equipment.

U.S. Pat. No. 10,543,782 discloses mobile equipment with one or more cameras mounted on the mobile equipment, and a display screen which can be used to show one or more of the camera views, including a view of the equipment environment stitched together from multiple cameras. However, the above patent does not include a way for an operator to closely monitor the movement of the mobile equipment within the environment.

The present disclosure is directed toward overcoming one or more of the problems discovered by the inventor.

SUMMARY

In an embodiment, an augmented user interface (AUI) system of a machine is disclosed. The AUI system comprises a vision system having one or more cameras configured to capture footage of areas around the machine; a machine sensor system having a plurality of sensors mounted on the machine and configured to obtain measurements corresponding to movements of a plurality of machine parts; and a display system having at least one display screen, the display system configured to (i) generate a virtual machine model using the measurements and (ii) display an augmented machine view comprising the virtual machine model overlayed with the footage.

In an embodiment, a machine having a body is disclosed. The machine comprises a plurality of cameras mounted on the body of the machine and configured to capture video of areas around the machine and transmit the video in real time; a plurality of machine actuator sensors configured to measure movement of one or more components of the machine; and an augmented user interface (AUI) system communicatively coupled to the machine, wherein the AUI system is configured to (i) obtain a virtual model of the machine and (ii) display the virtual machine model of the machine synched and overlayed with the video of the areas around the machine.

In an embodiment, a non-transitory computer-readable medium is disclosed. The non-transitory computer-readable medium includes instructions that, when executed by one or more processors, cause the one or more processors to: obtain at least one actuator sensor reading, the at least one actuator sensor reading indicative of movement of a machine component; based on the at least one actuator sensor reading, update a virtual machine model of the machine component, wherein a movement of the virtual machine model of the machine component corresponds in real time to the movement of the machine component; obtain a video stream of an area proximate to the machine component; and overlay the video stream with the virtual machine model of the machine component to generate an augmented machine view, wherein the video stream and the virtual machine model of the machine component are synched together in time in the augmented machine view.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

For clarity and ease of explanation, some surfaces and details may be omitted in the present description and figures. In addition, it should be understood that, as used herein, the terms "side," "top," "bottom," "front," "rear," "above," "below," and the like are used for convenience of understanding to convey the relative positions of various components with respect to each other, and do not imply any specific orientation of those components in absolute terms (e.g., with respect to the external environment or the ground).

Figure 1:
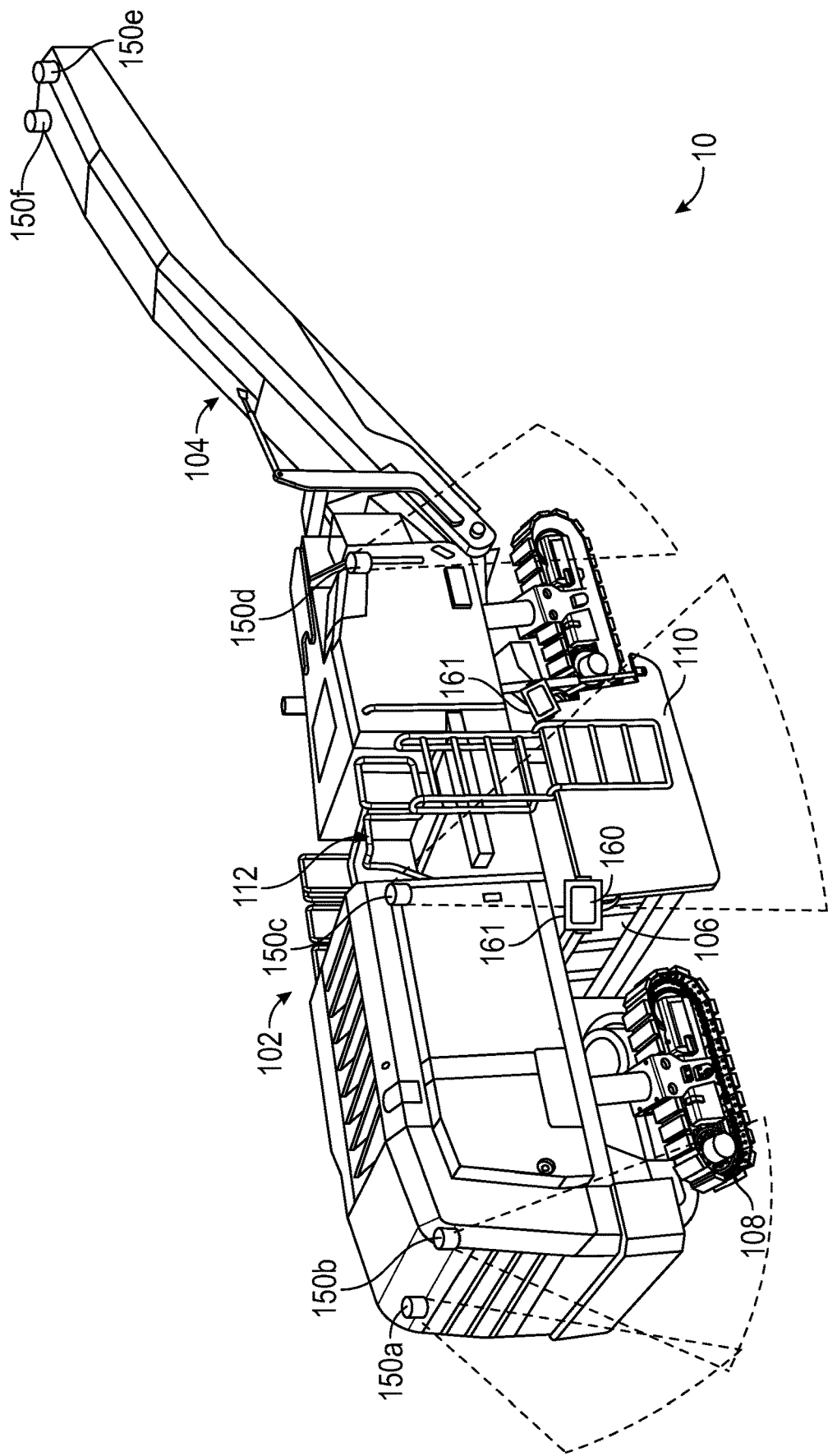
FIG. 1 shows a perspective view of a machine, according to an embodiment.

FIG. 1 illustrates a working machine 10, according to an embodiment. The machine may be mobile equipment intended to perform a task associated with an industry, such as paving, mining, construction, transportation, energy exploration, farming, or the like. In an exemplary embodiment, the machine is illustrated as a cold planer or road mill, made to, for example, remove pavement from driving surfaces. However, it should be understood that the machine may be any type of equipment, including a dump truck, wheel loader, asphalt paver, backhoe loader, skid steer, track loader, compactor, dozer, electric rope shovel, excavator, forest machine, hydraulic mining shovel, material handler, motor grader, pipe-layer, road reclaimer, telehandler, tractor-scraper, or the like, as well as ordinary road vehicles (e.g., automobiles, semi-trucks, etc.), aircraft, or maritime vessels (e.g., boats, ships, barges, etc.).

As illustrated, the machine 10 has a main body 102 and a conveyor 104. The main body 102 includes a milling chamber 106, skis 110 (one visible), tracks 108, and a top operator platform 112. The milling chamber 106 includes mechanism(s) to shift it up, down, and side to side with respect to the ground (i.e., with respect to the skis 110). The conveyor moves the milled material from the milling chamber 106 to an outside receptacle (e.g., a dump truck hopper).

The machine 10 may include one or more cameras 150a-f (which may be collectively referred to herein as camera(s) 150). Each camera 150 captures video of a field of view of an area around the machine 10. For example, a forward-facing camera captures a front field of view of an area in front of the machine, a right-side-facing camera captures a right field of view of an area to the right of the machine, a left-side-facing camera captures a left field of view of an area to the left of the machine, a rear-facing camera captures a rear field of view of an area in the rear of the machine, and a corner-facing camera captures a field of view of an area on two sides and a corner of the machine. The illustration of FIG. 1 shows a rear-side-facing cameras 150a, corner-facing cameras 150b/150d, right-side-facing camera 150c, and front-side-facing cameras 150e/150f on the body of the machine, and forward and side facing cameras on the conveyor of the machine. However, it should be understood that the disclosure is not limited to the illustration. The machine may have a smaller or greater number of cameras mounted at different portions of the machine.

In an exemplary embodiment of the disclosure, the machine 10 includes at least one display screen 160 which may be used by a machine operator to observe a representation of the machine within the machine environment. In some embodiments, the machine 10 includes multiple display screens mounted at various points onto the body of the machine 10. For example, the machine may include one display screen 160 mounted on the left side of the machine body 102, one display screen 160 mounted on the left side of the machine body 102, and one display screen 160 mounted at the top operator platform 112. In some embodiments, the machine 10 has multiple display holders 161a/161b mounted at different points around the machine 10 (e.g., at various points on sides of the machine body, in the operator platform 112, etc.). As an example, FIG. 1 shows two display holder 161a/161b attached to the right side of the machine 10, one display holder 161a with a display screen 160 attached to it and one empty display holder 161b that a display screen 160 could be attached to. However, any number of display holders may be mounted on the machine 10. In some embodiments, no display holders may be used (e.g., if the display screen is remote or portable).

Figure 2:
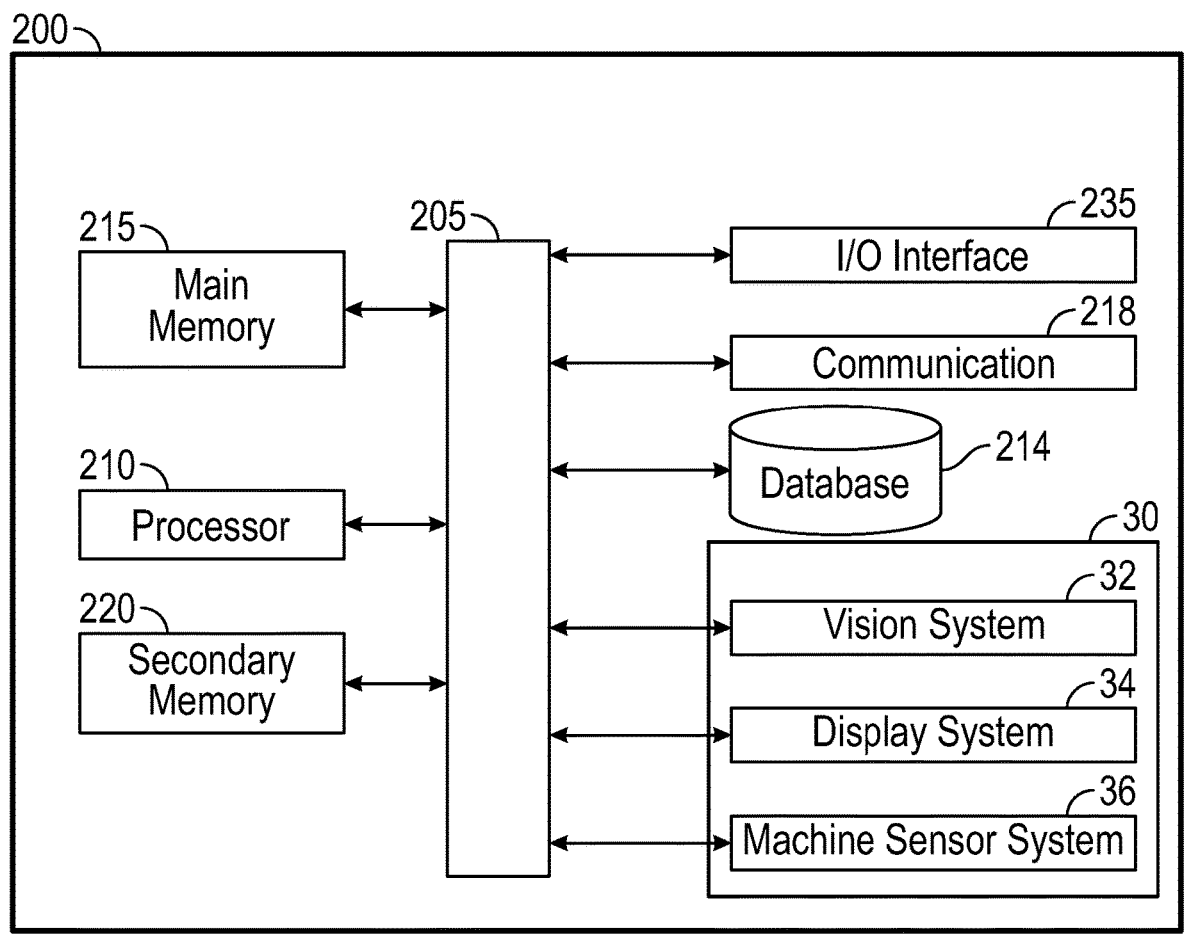
FIG. 2 shows a processing system by which one or more processes described herein, may be executed, according to an embodiment.

FIG. 2 is a functional block diagram of an example wired or wireless system 200 that may be used in connection with various embodiments described herein. For example, system 200 may be used as or in conjunction with one or more of the functions, processes, or methods described herein (e.g., to store and/or execute the implementing software), and may represent components of the machine 10 (e.g., camera(s) 150, display system 34, etc.), remote terminals, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE), and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), flash memory (block-oriented memory similar to EEPROM), and the like. Secondary memory 220 may optionally include an internal medium and/or a removable medium. Removable medium is read from and/or written to in any well-known manner. Removable storage medium may be, for example, a magnetic tape drive, a compact disc (CD) drive, a digital versatile disc (DVD) drive, other optical drive, a flash memory drive, and the like.

The processor 210 can be operatively connected to a database 214. It should be noted that, while not shown, additional databases 214 may be linked to the system 200 in a known manner. Furthermore, these databases 214 may be external to the system 200. In an example, the database(s) 214 can include virtual machine model information (e.g., machine component sizes, proportions, movement limitations, movement directions, etc.) and machine to virtual model mapping directions. The database(s) can be stored locally on the machine 10 or can be located separate from the machine and accessed remotely. The system 200 can include a communication module 218 that can provide information to the database(s) 214 such as machine sensor information.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., display console 158, or in a smartphone, tablet computer, or other mobile device).

System 200 may include a communication interface 218. Communication interface 218 allows software and data to be transferred between system 200 and external devices (e.g. printers), networks, or other information sources. For example, computer software or executable code may be transferred to system 200 from a network server via communication interface 218. Examples of communication interface 218 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network or another computing device. Communication interface 218 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Computer-executable code (e.g., computer programs, such as the disclosed software) is stored in main memory 215 and/or secondary memory 220. Computer-executable code can also be received via communication interface 218 and stored in main memory 215 and/or secondary memory 220. Such computer programs, when executed, enable system 200 to perform the various functions of the disclosed embodiments described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory and/or removable medium), and any peripheral device communicatively coupled with communication interface 218 (including a network information server or other network device). These non-transitory computer-readable media are means for providing software and/or other data to system 200.

In an exemplary embodiment of the disclosure, the system 200 includes an augmented user interface (AUI) system 30 of a machine 10. In embodiments, the AUI system 30 includes a vision system 32, a display system 34, and a machine sensor system 36. In some embodiments, one or more of the sub-systems of the AUI system 30 (e.g., the vision system 32, the display system 34, and the machine sensor system 36) can include their own specialized processors.

Figure 3:
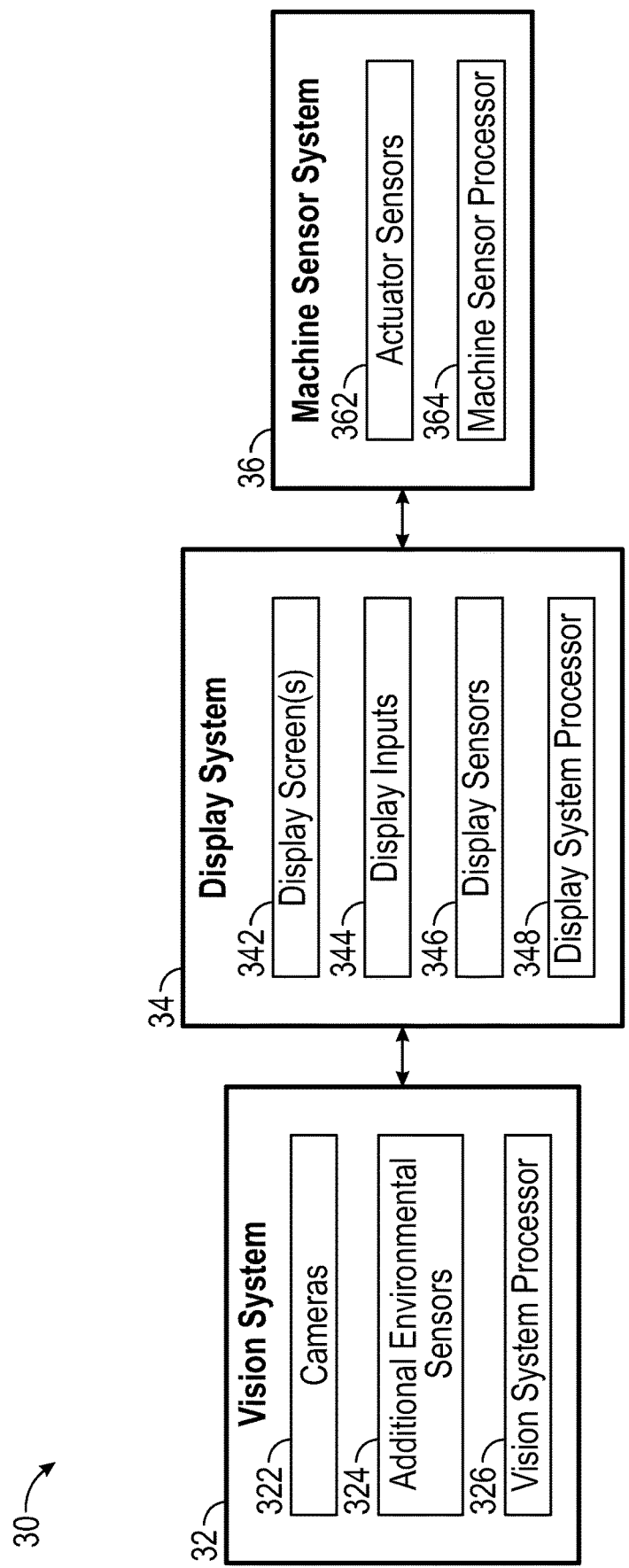
FIG. 3 shows a detailed functional block diagram of an AUI system, according to an exemplary embodiment.

FIG. 3 is a more detailed functional block diagram of the vision system 32, the display system 34, and the machine sensor system 36 of the AUI system 30.

The vision system 32 is configured for surveying the environment around the machine and at least partially processing the obtained environment data. The vision system 32 may include cameras 322 distributed around the machine and capable of providing a complete 360-degree view around the machine. In embodiments, the cameras 150 described above in reference to FIG. 1 are used as the cameras 322 of the vision system 32. The cameras may use visible light to capture high definition video, comprising a plurality of image frames. In some embodiments, one or more of the cameras is capable of capturing images during nighttime or in other types of poor visibility conditions (e.g., foggy or dusty days). For example, one or more of the cameras may be a thermal imaging or infrared camera capable of capturing video/images using infrared (IR) radiation. In one embodiment, one or more of the cameras may be a stereo camera having multiple image sensors and capable of perceiving depth.

The vision system 32 may additionally include one or more other environment sensors 324. For example, the vision system 32 includes a LIDAR system capable of 3-D mapping the machine environment and, for example, helping to identify the position/orientation of the machine 10 within the environment and any objects around the machine 10. The LIDAR system may include a plurality of light sources, such as lasers, and one or more detector devices. Each laser may generate a laser beam which is directed at various points of the machine environment. The detector devices may receive the laser beams after reflection off of various points of the environment. In another example, the vision system 32 includes a RADAR system capable of detecting various objects/obstacles within the machine environment. The RADAR system may include a plurality of transmitters that generate radio- or micro-frequency electromagnetic waves, and one or more receivers to catch the reflected waves.

In some embodiments, the vision system 32 is capable of producing a three-dimensional representation of at least some of the environment around the machine. In various embodiments, the vision system 32 produces three-dimensional representations of the environment using one or a combination of: (i) images captured by two or more overlapping cameras 322, (ii) images captured by one or more stereo cameras, (iii) a LIDAR system, and (iv) a RADAR system. In some embodiments, data obtained by one of the additional environment sensor systems 324 is used to supplement the footage captured by the cameras 322.

The cameras and, optionally, the additional environment sensors, transmit captured information to a vision system processing 326. In one exemplary embodiment, the cameras stream or otherwise transmit real time captured video, comprising a plurality of image frames, to the vision system processor. The vision system processor may execute one or more functions, processes, and/or methods for performing standard video processing functions, for example, image enhancement, compression, segmentation, smoothing, etc. In one embodiment, the vision system processor performs viewing angle adjustments (e.g., tilt and skew adjustments). In an exemplary embodiment, the vision system processor also aligns and stitches together video captured by adjacent cameras (or non-adjacent cameras with adjacent field of views). In an exemplary embodiment, the vision system processor performs object and terrain detection/recognition functions using at least one of the camera, LIDAR, and RADAR systems.

The vision system 32 may be communicatively connected to the display system 34 and is able to transfer the processed (e.g., stitched and/or analyzed) vision system data to the display system 34 in real time. It should be noted that the vision system 32 may use a combination of wired and wireless connections or only one type of connection.

The display system 34 includes display devices and various components associated with the display devices. In an exemplary embodiment, the display system 34 includes at least one display screen 342, one or more human input devices 344, and display screen sensors 346.

The display screen 343 may be in various embodiments used as the display screen(s) 160 of the machine 10, described in FIG. 1. The display screen 343 may be s plasma display, light-emitting diode (LED) display, liquid crystal display (LCD), and/or the like. The display system 34 also includes at least one human input device or display input 344 that is temporarily or permanently associated with the display screen 343. In an exemplary embodiment, the display system 34 includes a touchscreen that acts as both the display screen 343 and the display input device 344. Alternatively or additionally, the display system 34 may receive inputs via other means, such as microphones, buttons, touchpads, keyboards, computer mice, trackballs, joysticks, pen-based pointing devices, cameras, and/or the like. In an exemplary embodiment, the display screen 343 includes more than one types of display inputs 344. In one embodiment, the display system 34 includes multiple display screens 342, each with their own display inputs 344. In another embodiment, multiple display screens 342 that share one or more display input devices 344. Note that for the purposes of this disclosure, "display screen" may refer to one or more actual display screens.

In an exemplary embodiment, the display system 34 includes display sensors 346 that may be permanently or temporarily associated with the display screen 342. The display sensors 346 provide the display system with the position and orientation of the display screen 342.

In one embodiment, display sensors 346 are located in display holders that are physically mounted on the machine, and configured to attach and pair to the display screens 342. The display holders may be adjustable screen holders which may be moved and rotated along different axes and angles. The display holders may be mounted at one or more strategic locations around the machine, for example, at the left side of the body of the machine, the right side of the body, and at an operator platform on top of the machine. In one exemplary embodiment, the display system 34 determines the position (e.g., location and orientation) of a display by using the known location of a holder and information from sensors within the holder or the display screen. In one variant, a plurality of individual display screens 342 are each permanently attached/mounted in their individual holders. In another variant, display screens 342 may be temporarily attached and paired to a display holder, so that the display system 34 would only know the position of a display screen 342 while it is mounted in a display holder. In an exemplary embodiment, the display screen 342 may be temporarily mounted to any of the display holders connected to the machine. In one example, a display holder includes display input devices 344 and mounting a display screen 342 in the holder pairs the display screen 342 with both the holder and the input devices 344.

In one embodiment, the display sensors 346 are located in a device not physically mounted to the machine. In an exemplary embodiment, the display screen 342, the display inputs 344, and the display sensors 346 are all part of a mobile electronic device (e.g., a smart phone or tablet) wirelessly connected to the AUI system. The display sensors 346 of a mobile electronic device can comprise one or more accelerometers within the mobile electronic device.

The display system 34 is in communication with the rest of the AUI 30. More specifically, the display terminal 34 is communicatively connected at least to the vision system 32, the machine sensor system 36, and the processor 212 (e.g., via the bus 205). In various embodiments of the disclosure, the whole or a portion of the display system 34 is communicatively connected to the AUI system 30 by one or a combination of: (i) wired connections in the machine 10, (ii) via local wireless network(s) (e.g., using a Bluetooth or Wi-Fi connection), and (iii) via remote wireless network(s).

In one embodiment, the display system 34 may include a remote terminal which may comprise any type of computing device capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that a remote terminal is a remote operating station by which a remote operator can observe, and optionally, operate the machine.

Data from and to the display screen 342, display inputs 344, and display sensors 346 may be processed and controlled in display system processing 348. The display system 34 communicates with the vision system 32 and the machine sensor system 36. The display system processor 348 (i) generates a real-time virtual machine model (based on data provided by the machine sensor system 36), (ii) appropriately overlays the virtual machine model onto video footage provided by the vision system, and (iii) based on data received from the display inputs 344 and, optionally, the display sensors 346, generates an image (video) for the display screens 342.

The machine sensor system 36 of the AUI system 30 may receive sensor data/measurements via actuator sensors 362 associated with various machine components and sub-systems, and use the machine sensor processing 364 to interpret the sensor data (e.g., to map the sensor data onto movements/positions of machine components and thereby model the actual machine?).

Various sub-systems of the machine may include a track steering sub-system (including independent steering of different machine tracks), a hydraulic shift system for drum depth control (optionally, separate ones for each side; also optionally, shifting side to side), a drum control system (including hydraulic radial piston motor controlling cutting rate), and so forth. The sensors 362 may be configured to determine the movement of different actuators within the various machine sub-systems. In one embodiment, the machine sensor processor 364 uses actuator sensor data to determine the precise physical metrics (e.g., positions, orientations, angle and velocity measurements, etc.) of various machine components. For example, the machine sensor system 36 may use sensor data to determine the steering angles of each of the tracks of the machine, the angle of the conveyor, the speed of the cutting drum, height of the chamber, etc. In certain embodiments, the machine sensor system 36 is part of/integrated with the greater machine control system, responsible for instructing the machine and its components (or sub-systems).

The machine sensor system 36 is connected to the rest of the AUI system 30. More specifically, the machine sensor 36 may be communicatively connected to the display system 34 and is able to transfer the machine sensor system data (e.g., data specifying position, orientation, movement of individual machine component) to the display system 34.

INDUSTRIAL APPLICABILITY

Embodiments of the present disclosure relate to augmented user interface (AUI) systems for working machines such as milling machines (e.g., cold planers), and systems, components, and methods thereof. The disclosed AUI interface system can include a vision system, a machine sensor system, and a display system that, in combination, can perform the functions and methods described herein.

Figure 4:
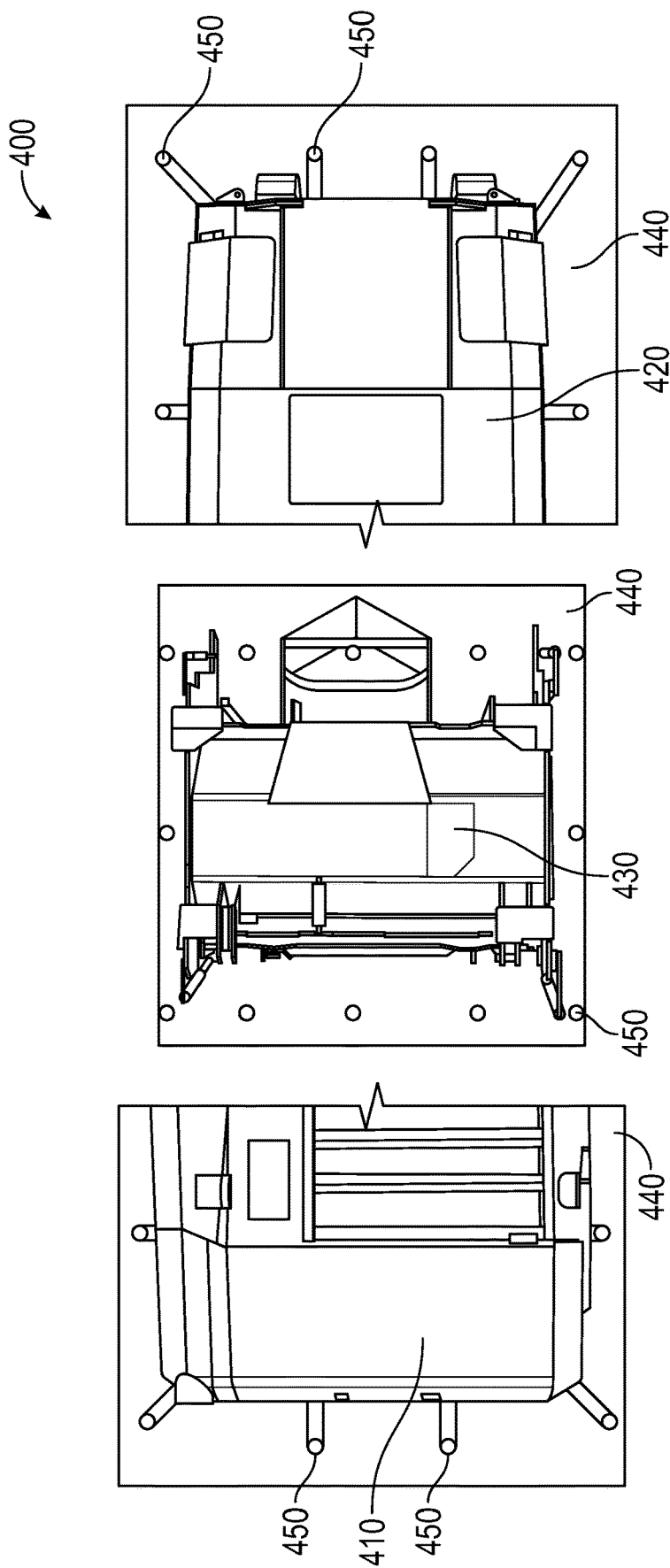
FIG. 4 shows exemplary plan views of a milling machine, according to an embodiment.

FIG. 4 shows exemplary plan views of a rear portion 410, a front portion 420, and a central chamber 430 of a milling machine 400 within a machine environment 440. Cameras 450 of the milling machine 400 may be arranged around and mounted on the machine 400, as shown. Note that some cameras 450 arranged around the chamber 430 may be attached to parts of the machine not visible in FIG. 4. For example, some of the cameras 450 around the central chamber 430 may be attached to an underside portion of the body (not shown) of the machine 400 that is located above and around the chamber 430. The milling machine 400 and its various components (e.g., cameras 450, etc.) may be implemented in various embodiments as the machine 10 and its components (e.g., cameras 150), as described above in reference to FIGS. 1-3.

Figure 5:
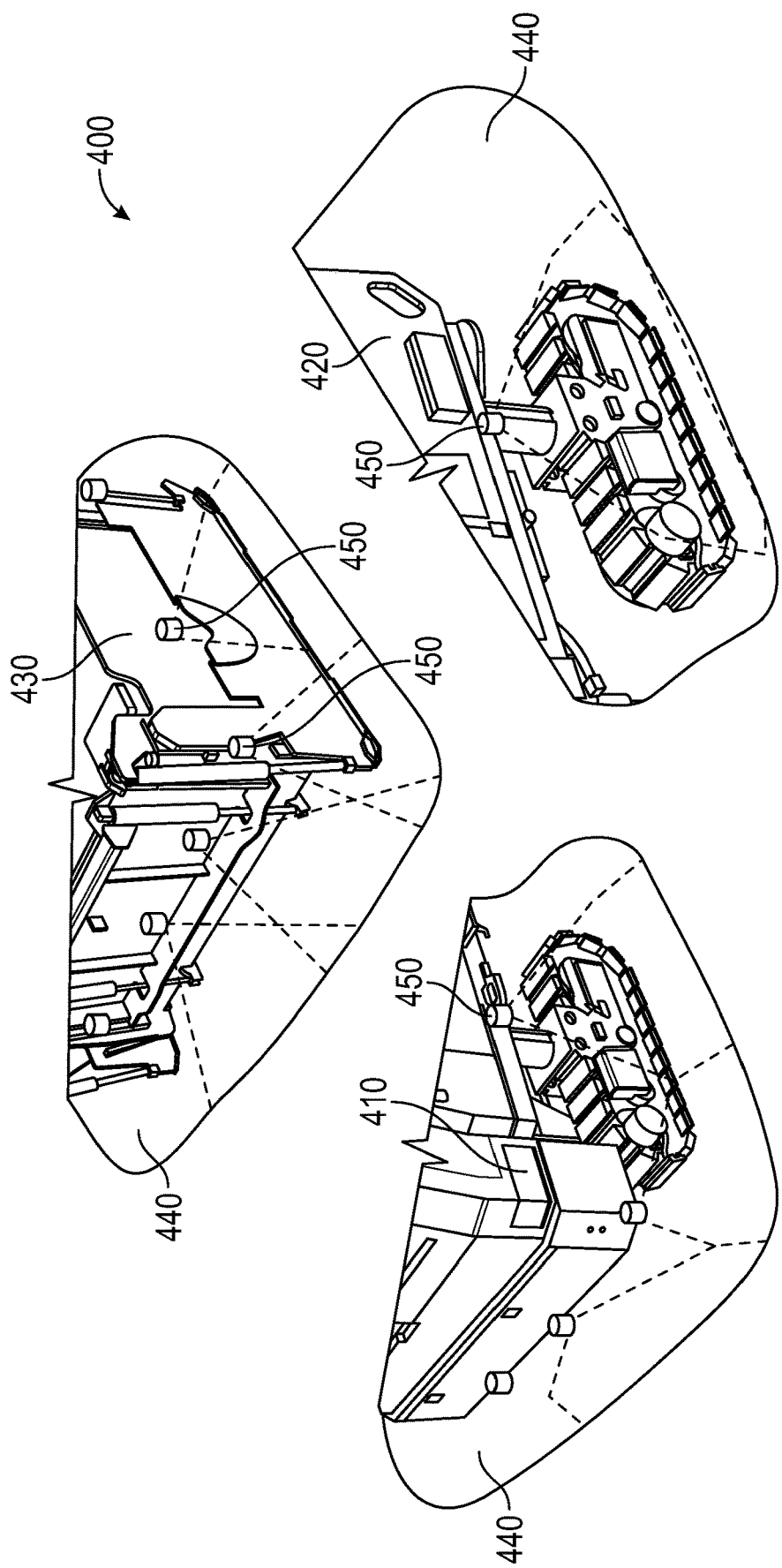
FIG. 5 shows side perspective views of the milling machine of FIG. 4.

FIG. 5 shows side perspective views of the rear portion 410, the front portion 420, and the chamber 430 of FIG. 4. FIG. 5 additionally shows the fields of view of the machine environment 440 that may be captured by individual cameras 450. The adjacent and/or overlapping fields of view of the cameras may capture a complete or almost complete view of the environment 440 around the machine 400 and around individual parts (e.g., rear 410, front 420, chamber 430) of the machine 400. In some embodiments of the disclosure, overlapping views of the cameras 450 may be used to capture a three-dimensional representation of at least some parts of the environment. In addition, one or more supplemental vision systems (e.g., LIDAR or RADAR) may be used to add to or enhance a three-dimensional representation of the environment. The supplemental vision systems may be the supplemental vision systems described above in reference to FIGS. 1-3.

Figure 6:
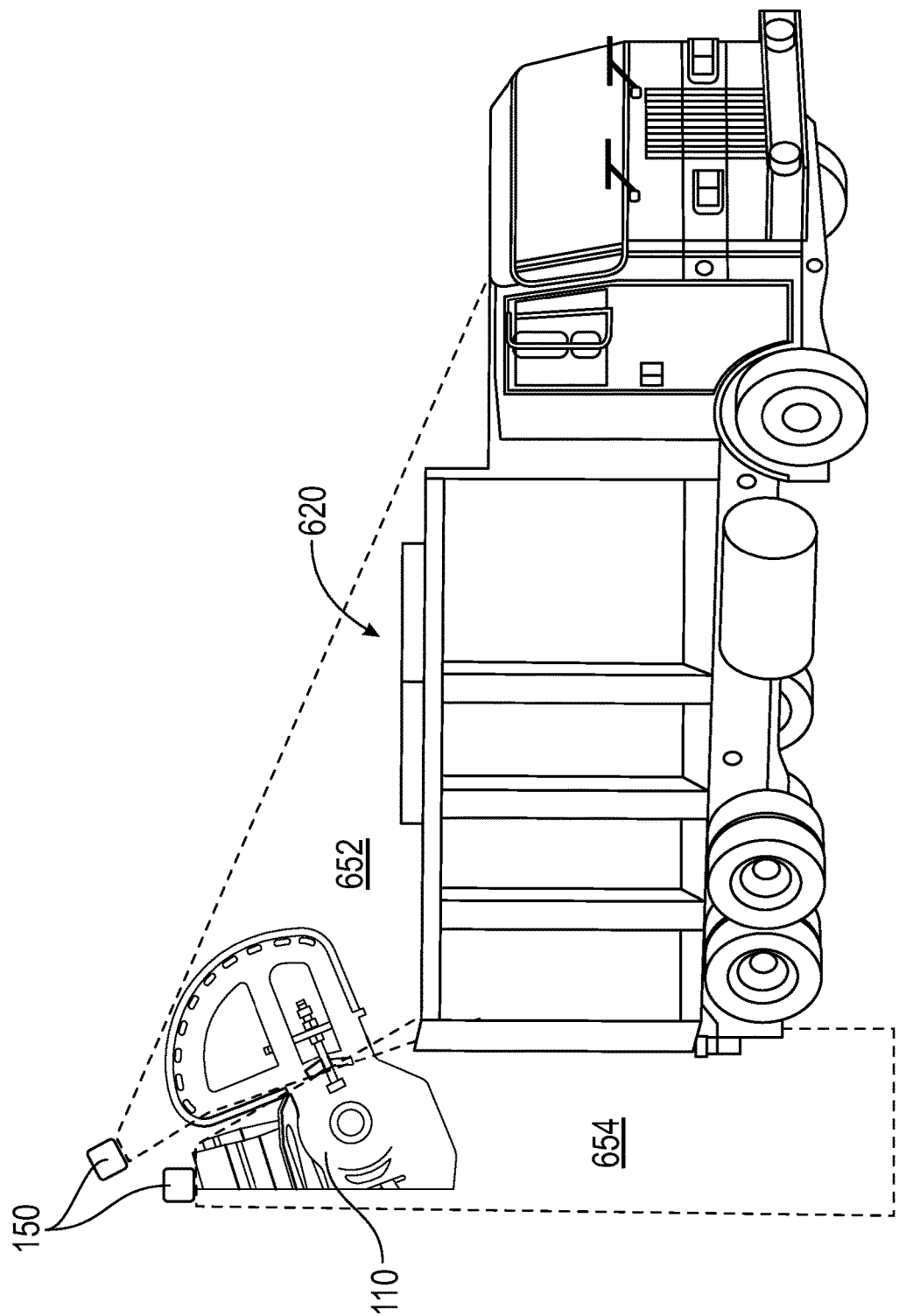
FIG. 6 shows cameras of a machine capturing machine environment, according to an embodiment.
Figure 7:
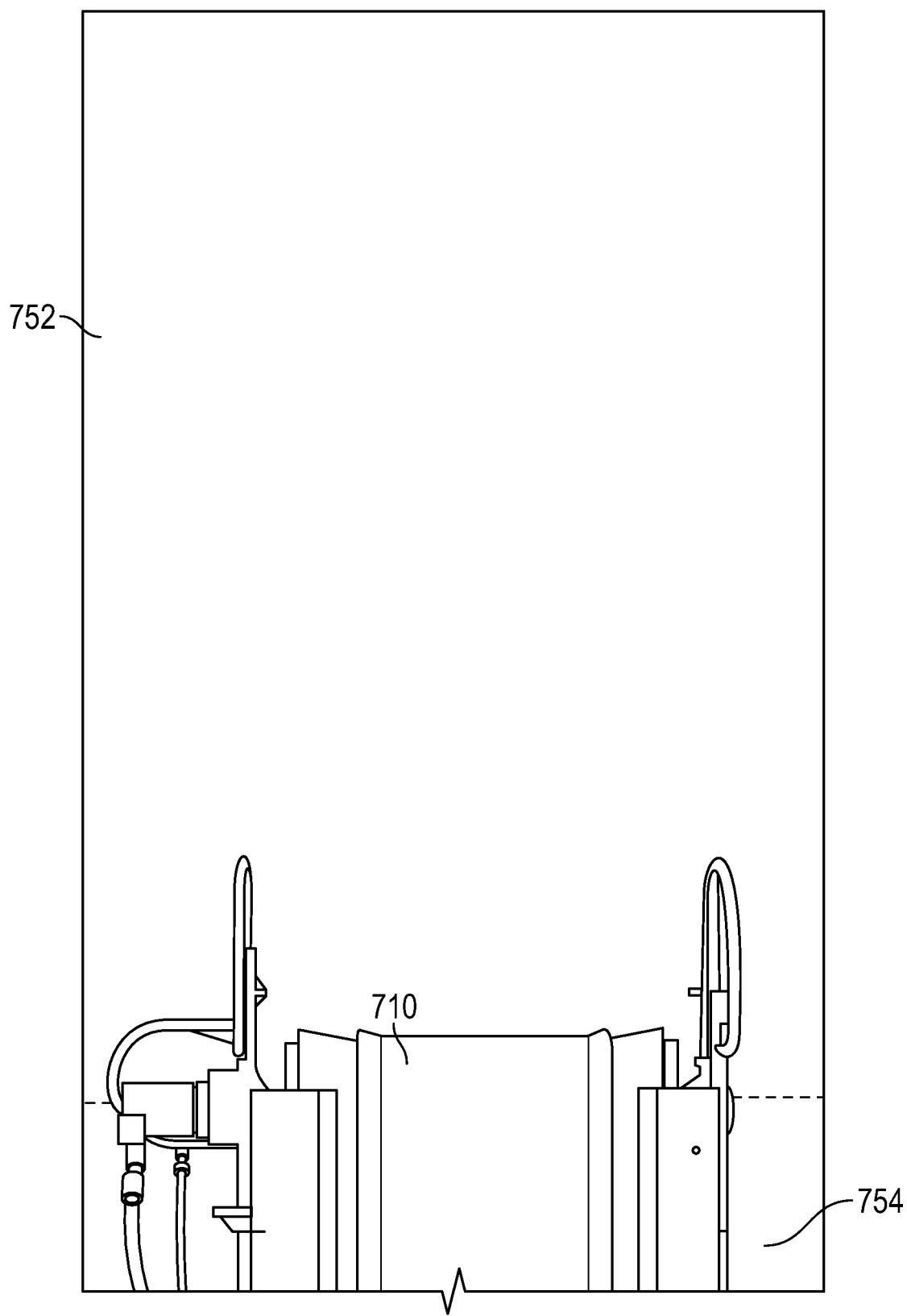
FIG. 7 an exemplary augmented view that may be generated by the AUI system using the machine configuration of FIG. 6.

FIGS. 6 and 7 show an example of cameras 150 of the machine 10 capturing areas of machine environment (FIG. 6) and an augmented view that may be generated using by the AUI system 30 using the captured camera footage (FIG. 7).

FIG. 6 shows a side view an end of an actual conveyor 104 of the machine 10, according to an exemplary embodiment. Cameras 150 mounted on the end of a milling machine conveyor 104 capture adjacent camera views 652/654 of the machine environment (e.g., a dump truck 620). Machine 10 and camera 150 embodiments described above with respect to FIGS. 1-3 may be used in the exemplary embodiment of FIG. 6.

FIG. 7 shows an example of an augmented view of the machine 10 and environment 620 of FIG. 6, that may be generated by the AUI system 30. The augmented view of FIG. 7 shows camera-captured machine environment that has been combined and processed (e.g., stitched together) into a single image 752/754, overlayed with a virtual model 710 of the conveyor 104. The conveyor in the virtual model 710 is shown from above, since the camera footage 752/754 was captured from a high angle (as may be seen in FIG. 6).

Figure 8:
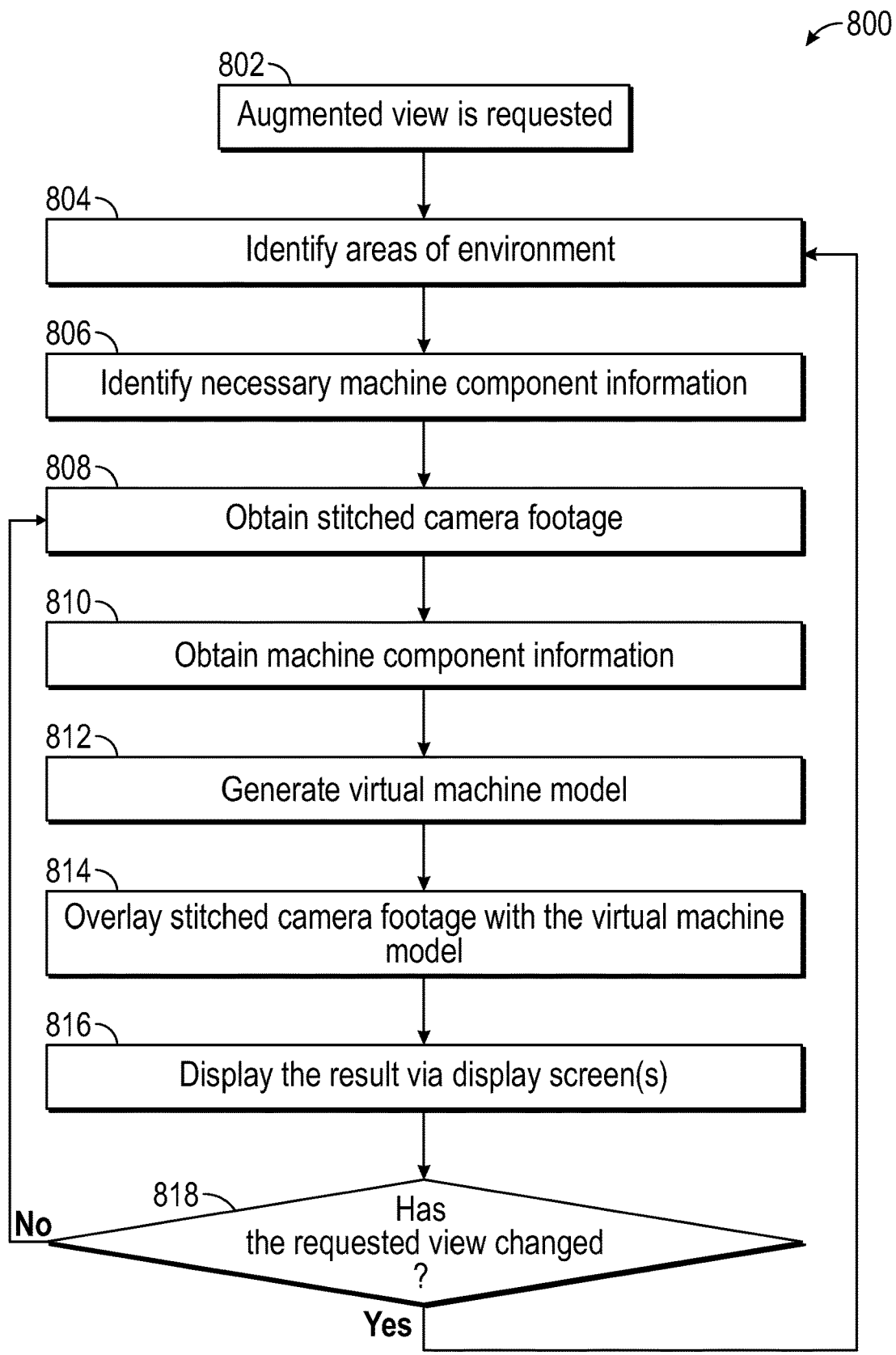
FIG. 8 is a flowchart of a process of generating an augmented machine view, according to an exemplary embodiment.

FIG. 8 is a flowchart of a process 800 of generating an augmented machine view in real time having a dynamic virtual machine depicted in the actual machine environment, as captured by cameras of the machine. The process 800 can be implemented using the AUI system 30 described above with respect to FIGS. 2 and 3.

At block 802 of process 800, the system receives a request for a particular augmented view of the machine, e.g., from an operator. In an exemplary embodiment, the operator uses a display screen and a display input device (e.g., a touch screen mounted on the machine) to select a desired augmented machine view (e.g., combined views of the environment and virtual machine model).

In one embodiment of the disclosure, the screen 160 of the display system 34 may show a graphical user interface which enables the operator to request a particular view of the virtual machine model augmented with footage of the actual machine environment. The operator may request the augmented view by one or more of: (i) selecting the view from a list of options (e.g., full machine top view, front-left track close view, conveyor top view, drum chamber left view, etc.), (ii) navigating to the view from a default starting view by using navigation controls (e.g., shift, rotate, zoom, etc.), and (iii) using a "window/portal" mode of the AUI system and physically orienting the screen in a particular direction/location.

In one embodiment, a default starting view may be a full perspective view of the virtual machine model. In another embodiment, the default starting view may be at least partially based on the location and orientation of the display screen (e.g., in a portal/window mode). Further, the AUI system 30 can have predefined and default augmented views that are displayed according to system or machine status (e.g., changes in operation of the machine such as direction) without an operator request.

In one example, the operator may first select from a list of predetermined views and then refine the view by using the navigation controls. The list of predetermined views may include, for example, default views of each of the major sub-systems of the machine, a full machine view at various angles, and a portal view that depends on the position of the currently used display screen.

The selected/requested view or view request may include a selection made for a number of augmented view parameters. In one embodiment, the parameters of a view request may include: portion of the machine, angle of augmented view, and sub-systems hidden/shown in the view. As an example, a view request may comprise: a selection of the rear portion of the machine, a request for a straight on view (angle) from the right of the machine, and a request to have outer walls of the machine hidden from view. Some of the parameters may not need to be specifically selected by the operator.

For example, in one embodiment, an operator using the AUI system in a portal view may determine the angle of the view by physically rotating the display screen. The viewing angle automatically selected for the augmented view may correspond to the angle of the display screen such that the display screen gives the impression of providing a see-through window or portal to a part of the machine directly or at a distance behind the screen (i.e., the viewing angle is orthogonal to the plane of the display screen). In portal mode, the portion of the machine (or the machine components) requested for the view may be automatically selected by the system based on the location of the display screen. Alternatively, portal mode operation may limit the possible viewable machine components to a list of those machine parts whose location is in a "line of sight" of the display screen/portal (and the operator may select from the list). In other words, in portal mode, the viewing angle is automatically determined (by the AUI system) based on the orientation of the display screen and the viewing portion of the machine is at least partially automatically determined based on the location of the display screen with respect to the machine. However, the operator may still manually select which parts and sub-systems of the machine should be hidden or shown.

At block 804, in response to the requested augmented view in step 802, the AUI system 30 identifies the areas of the environment needed for the requested view. In one embodiment, the AUI system determines that video streams from area(s) of the machine environment should necessarily or preferably be shown from specific angles in order to generate the requested view. The identified area(s) of the machine may comprise a single continuous area or a plurality of areas that are not-continuous (not touching) with each other.

At block 806 of process 800, the AUI system 30 identifies the machine component (position and movement) data needed for the requested view. In one embodiment, the AUI system 30 determines that position and movement information of one or more specific machine components is needed. For example, if the requested view is focused on a part of the machine, the AUI system 30 may identify a need for information relating only to the components that are located in the part of the machine and visible in that view. This type of narrow identification of machine components or sub-systems may reduce the time needed by the AUI system 30 to obtain the machine component information. In another embodiment, the AUI system 30 may determine that position and movement information available for all machine components being monitored by the machine sensor system 36 may be required. This may be useful if, for example, an operator is quickly changing virtual machine views, so that movement and position information of many various components of the machine become necessary in short order.

In one embodiment, the AUI system 30 identifies the required machine component data based at least partially on operator selection of certain systems of the machine. For example, if the requested view has a first part of the machine blocking a second part of the machine (e.g., the body of the machine blocking a part of the conveyor of the machine), there is no need to obtain movement information on the second/blocked part of the machine. However, if the operator chose to hide the body of the machine so that the conveyor is fully visible, the AUI system 30 may determine that movement/position information for the entire conveyor is needed.

At block 808 of process 800, the AUI system 30 (or a processor of the system) sends a command to the vision system 32 to request video image frames of environment areas identified in step 804. The request may include specific angles associated with the identified areas. The vision system receives the request for video frames and, based on the request, identifies which camera fields of view encompass portions of (or the entire) requested areas of the machine environment. In other embodiments, this camera identification is performed by other parts of the AUI system (e.g., the display system 34 may make the calculation). Once the right cameras are identified, image frames from those cameras are processed to generate the requested video.

In one embodiment, the processing may include one or more of: (i) stitching footage of two or more cameras together, (ii) performing image skew corrections/changes (to, for example, match the required viewing angles), (iii) identifying three-dimensional features of the environment, and (iv) other such operations that may help change the originally captured camera footage into video matching the criteria of the request. The vision system then sends the processed video frames of the requested areas to the main system processor 212 (or the display system processor 348).

In an exemplary embodiment, the video camera stream(s) are processed and transmitted in real time. In other words, as the video of the environment in the requested area changes, the video image frames are constantly being processed (e.g., stitched, skewed, etc.) and transmitted by the vision system 32. For example, if the AUI system 30 requests a view near the left-front tracks of the machine, the vision system 32 transmits a constantly updated video stream of appropriately processed image frames (from cameras monitoring the area around the left-front tracks).

In one embodiment, the constant processing of video image frames comprises processing every incoming image frame, so that the outgoing video frames would have the same frame rate per second (fps) as the incoming (camera) signals (e.g., 30 fps). In another embodiment, the vision system processor 326 processes every other incoming image frame (e.g., outputting a 15 fps video from 30 fps cameras) or processes incoming image frames that arrive at some predetermined time intervals (greater than the native time intervals of the camera). This may reduce the quality of the outgoing video footage, however, the processing requirements of the vision system 32 and the lag time between capturing footage of the environment and providing processed footage to the AUI system 30 may also be reduced.

In one embodiment, the vision system 32 additionally transmits information relating to three-dimensional aspects of the environment of the needed area(s) (e.g., depth maps generated using stereo cameras, multiple overlapping cameras, supplemental LIDAR systems, etc.). In one embodiment, the vision system 32 additionally performs one or more object recognition algorithms on the relevant video footage, and for example, transmits indicators of detected objects/obstacles with the video image frames (e.g., separately or attached as metadata).

At block 810, the display system 34 obtains machine component information from the machine sensor system 36. The AUI system 30 or display system 34 may request specific or total machine component information from the machine sensor system 36, based on the determination made in step 806. In an exemplary embodiment, the machine sensor system 35: (i) receives a request for particular machine component information, (ii) obtains actuator sensor data from sensors 362 monitoring the particular machine component(s), (iii) determines the current position and movements of the machine component(s) based on the actuator sensor data, and (iv) transmits the current position/movement information of the machine component(s) to the system processor 212 or the display system 34. In one embodiment, the machine sensor processor 364 calculates the current position and movements of the machine component(s) using one or more predetermined algorithms specific to the machine. The machine component information may include position and movement (e.g., speed) values of one or a plurality of different mechanical systems/components within the machine. In one alternate embodiment, at block 810, the machine sensor system 36 receives a request for movement and position information relating to all monitored parts of the machine. In this case, machine sensor system 36 performs all the same steps as described above, but applies them to all the actuator sensors 362 of the machine sensor system 36.

At block 812 of the process 800, the AUI system 30 generates a dynamic virtual machine model whose movements correspond in real time to the actual movements of the machine. In one embodiment, the AUI system 30 generates a full virtual machine model whose movements correspond, in real time, to the actual machine movements (including every sub-system of the machine). In another embodiment, the AUI system 30 generates only a portion of the dynamic machine model, the portion corresponding to the current requested view. Generating the virtual machine model can include receiving a dynamic virtual machine model from, for example, database 214, and updating that model based upon the sensor data from, e.g., actuator sensors 362.

One or more parameters of the generated dynamic virtual model may be based on operator preferences/selections. For example, the operator may choose to show or hide certain portions of the virtual machine. In another example, the operator may choose to have the virtual machine rendered in particular colors.

At block 814, the display system 34 overlays the processed video footage obtained in step 808 with the virtual machine model generated in step 812, in order to generate an augmented view of the machine. The processed video footage and the dynamic virtual machine are synched in time and location, so that the virtual machine movements at a particular time are shown in the correct locations of the machine environment at that particular time. The generated augmented view of the machine is then transmitted to the display screen, also in real time.

At block 816, the display screen 342 shows the resulting augmented view of the machine, comprising the dynamic virtual machine within the actual machine environment as captured by the cameras.

At block 818, if the requested view has not changed (i.e., the operator has not changed any of the parameters of the requested view), the process returns to block 808. The display system continues to request and receive real-time processed camera views from the vision system 32 (step 808) and real-time machine component information from the machine sensor system 36 (step 810). Steps 812 to 816 proceed in the same way as before, so that the display 342 continues to show the real time, updating augmented view of the virtual machine in the machine environment.

At block 818, if the requested view has been changed by the operator, the process 800 moves back to block 804. Since the requested view has changed, the areas of the environment and the needed machine components need to be identified again (steps 804 and 806). The operator may change the requested view by shifting, rotating or zooming in and out on the augmented model view, by selecting a different predetermined view of the model, and/or by moving a display screen while the system operates in window mode. In one embodiment, every registered change to the requested view (via display inputs and/or display sensors) triggers a return to step 804. In another embodiment, a change to the requested view in step 818 only triggers a "yes" response if the requested view remains unchanged for a predetermined period of time (e.g., half a second). This may all the system 30 to avoid performing calculations for views that are not actually of relevance to the operator.

In one alternate embodiment of step 818, if the system determines that the requested view has changed, but that the new requested view is only a zoomed in view of the previous requested view, the system may return to steps 808 through 816, but crop the resulting image, instead of performing calculations of steps 804/806. This may be useful if, for example, the display screen 32 being used by the operator is smaller than a resolution of the camera footage that is available in the original (zoomed out) view, so that blowing up a portion of the (video) image would still give a view of the environment having an acceptable quality.

While process 800 is illustrated with a certain arrangement and ordering of subprocesses, process 800 may be implemented with fewer, more, or different subprocesses and a different arrangement and/or ordering of subprocesses. It should be understood that any subprocess, which does not depend on the completion of another subprocess, may be executed before, after, or in parallel with that other independent subprocess, even if the subprocesses are described or illustrated in a particular order.

It is contemplated that process 800 is executed on the machine 10 (FIG. 2). In particular, the process 800 may be fully or partially executed by the controller 200 of the AUI system or another processing device within the AUI system 30. While process 800 could be executed remotely on an external system, the communications required to determine machine sub-system states and stream multiple video footage may increase traffic on the network(s) used for the communications and introduce delays, caused by network latencies, into process 800. In an alternative embodiment, a portion of process 800 could be executed on machine 10, while another portion of process 800 is executed on an external system. However, it should be understood that process 800 should be capable of being entirely executed on the machine.

The process 800 described above is a process for obtaining real-time observations of machine operation (represented by the virtual machine model) and footage of actual machine environment. However, some or all parts of the data gathered by the AUI system 30 during operation of the machine may also be stored or transmitted for later use. For example, any or all of (i) video signals from some or all of the machine cameras, (ii) signals from additional vision system sensors, (iii) machine sensor system data from some or all of the actuator sensors, and (iii) display sensor and input data, may be stored or transmitted for later use. In one embodiment, the display system 34 (or some external system) may use stored camera and machine sensor data to create an augmented machine view representing the machine as it was operated within its environment at some past day/time. This may be useful for, for example, investigating an accident or a machine performance issue.

FIGS. 9-12 show examples of augmented machine views generated by the AUI system 30 and seen on the display screen(s) 160 during various operator view requests according to the process 800 of FIG. 8. Various embodiments of the display screen(s) described above with respect to FIGS. 1-3 may be used as the display screen 160 shown in FIGS. 9-12. The camera-captured areas of environment 910 shown in FIGS. 9-12 may be compiled by the AUI system 30 using footage from one or more cameras 150, as described earlier in the disclosure.

Figure 9:
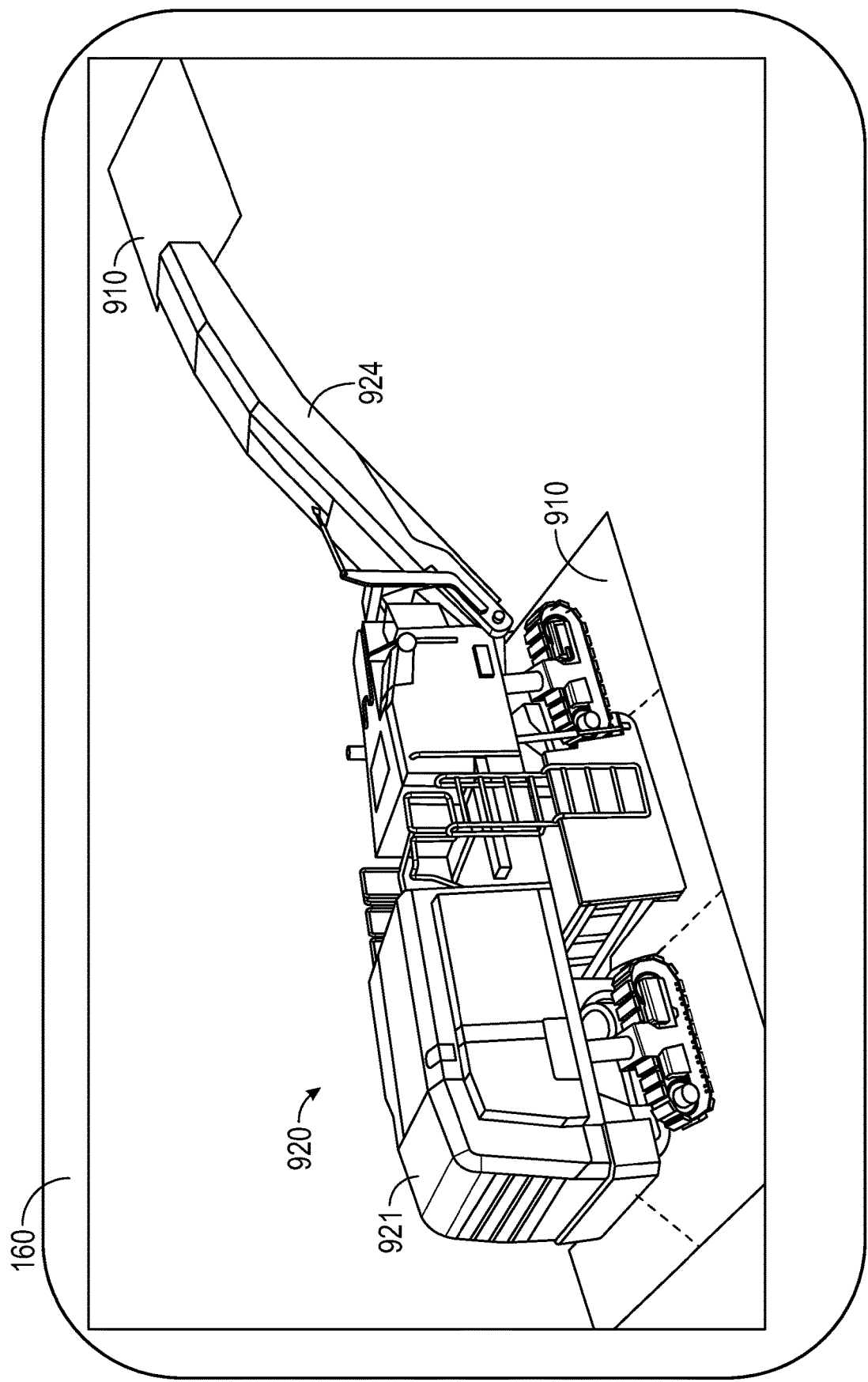
FIGS. 9-12 show exemplary augmented machine views that may be displayed by the AUI system.

In an exemplary embodiment, FIG. 9 shows an augmented machine view from a display screen 160 showing the virtual machine model 920 overlayed with camera footage 910 of the actual environment around the machine. In one embodiment, the augmented machine view shown in FIG. 9 is used as the starting/default view described with respect to step 802 of process 800 (FIG. 8).

Although FIG. 9 shows a full perspective view of the virtual machine model 920 (including a main body 921 and a conveyor 924) and its environment 910 as the default view, any other machine view could be used. For example, the starting or default view may be a view from a previous session of the AUI system 30, a top view of the virtual machine, a side view of the virtual machine, and so on. In one embodiment, the starting view shown by the display system of the AUI system 30 does not include the camera footage of the machine environment. In other words, the starting view may include only the virtual machine in a blank or virtual environment. In that case, the overlayed camera views would be added later (e.g., once the operator selects a non-default view).

Figure 10:
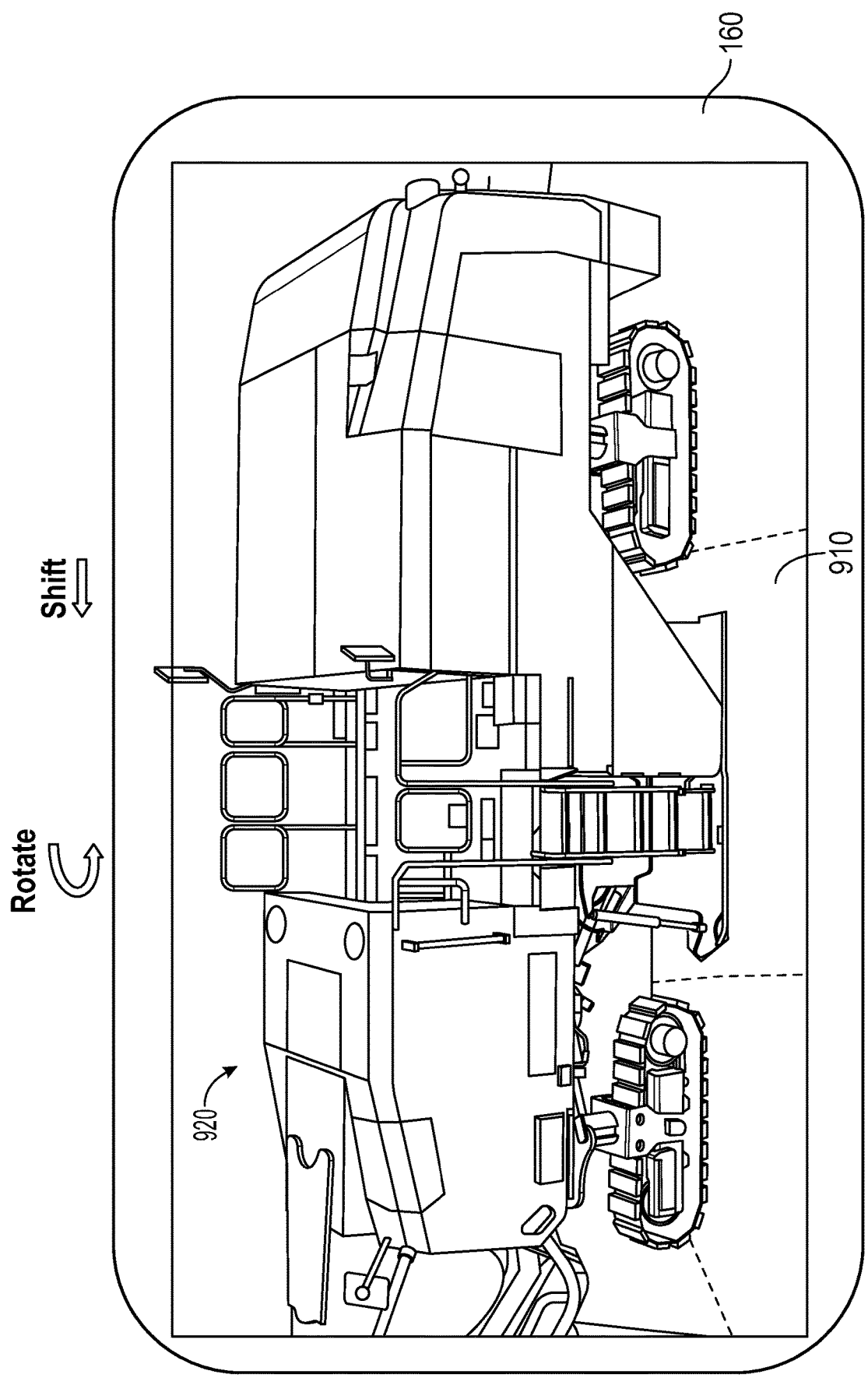

FIG. 10 shows the display screen 160 after it has been manipulated by an operator. The augmented view of the virtual machine model 920 and machine environment 910 of FIG. 9 has been shifted and rotated by the operator so that the left side of the main body 921 of the virtual machine 920 is shown. Within the process 800 of FIG. 8, transitioning from the view of FIG. 9 to the view of FIG. 10 may comprise: (i) obtaining camera footage processed from various cameras around the left side of the machine (step 808), (ii) obtaining angle and movement information for the left ski of the machine and the left tracks of the machine (step 810), (iii) generating a (partial) virtual machine 920 whose left ski and left tracks move in accordance with the obtained angle, height, and speed information (in sync with the actual machine), and (iv) overlaying the camera footage with the partial virtual machine model (step 814).

Figure 11:
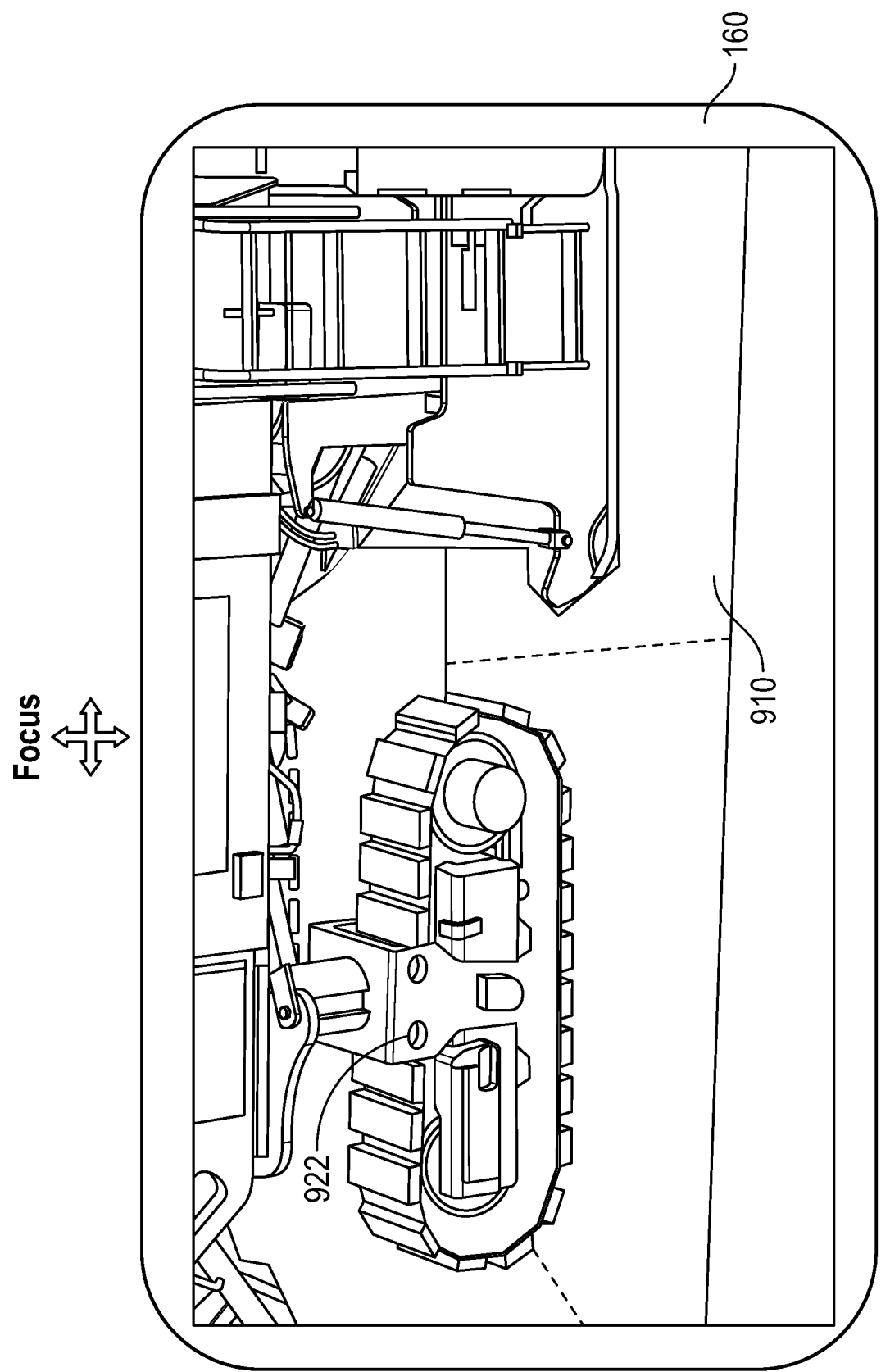

FIG. 11 shows the display screen 160 after the operator zooms in (or focuses) on the left tracks 922 and left ski (not labeled) of the machine in FIG. 10. In one embodiment, transitioning to FIG. 11 may comprise cropping the real-time view in FIG. 10, using the same vision system calculations as the zoomed-out view (of FIG. 10). In another embodiment, the zoom operation registers as a new view request (as discussed with respect to step 818).

Figure 12:
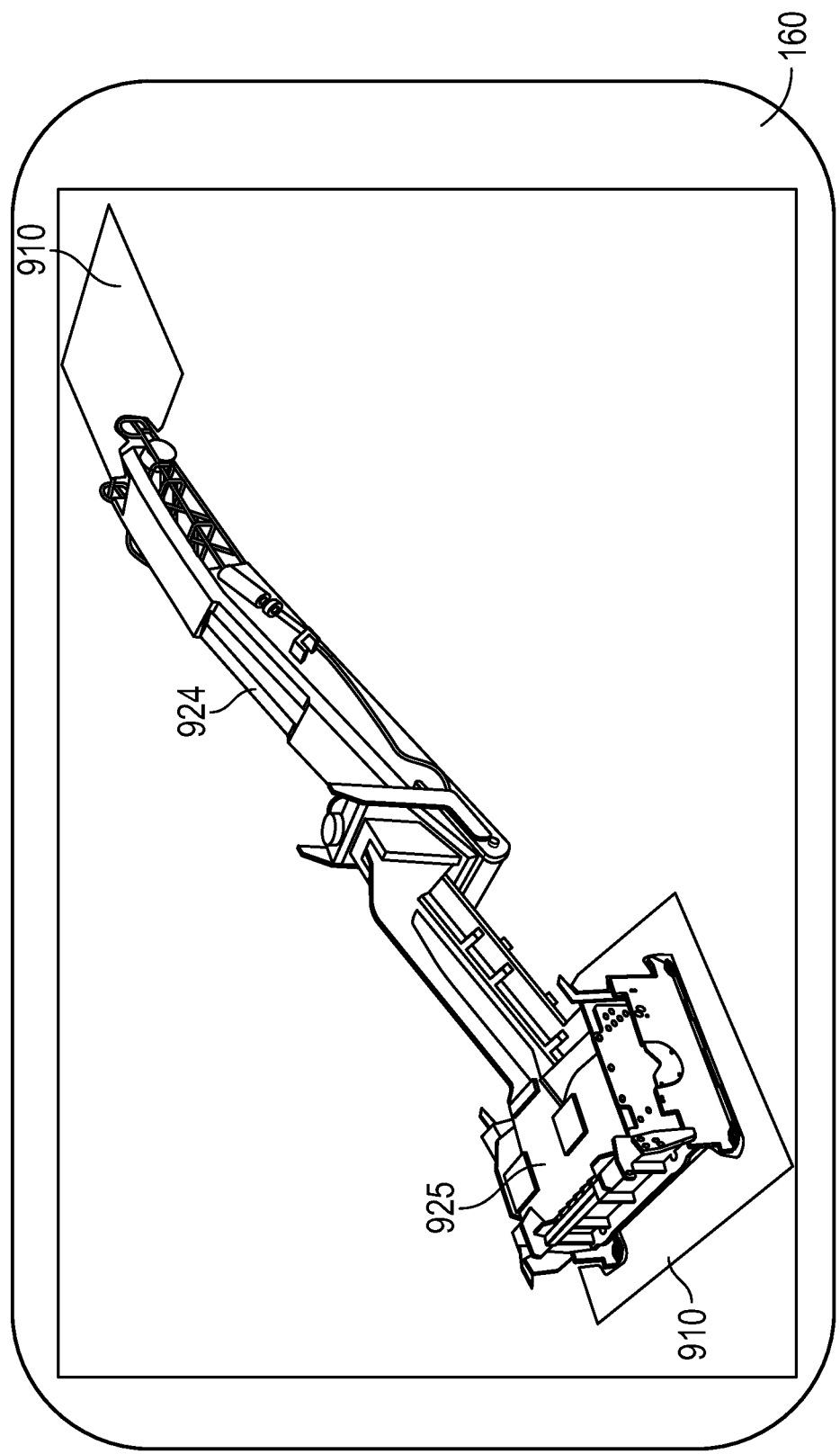

In an embodiment of the disclosure, the operator can hide (and un-hide) portions of the virtual machine model 920. For example, FIG. 12 shows the display screen 160 after the default image of the virtual machine model 920 in FIG. 9 has been changed to hide the main body 921 of the virtual machine 920 and some of the outer casing of the conveyor 924. A bottom portion of the conveyor 925 of the virtual machine model 920 is revealed in the new augmented view, so the AUI system 30 would need to request movement/position information related to the bottom part of the conveyor 924. The view would also require a different area of the environment 910 to be shown (adding areas around the far portions of the bottom part of the conveyor 924).

FIGS. 13-16 illustrate examples of a display screen 160 being operated in a portal or window mode, according to embodiments of the disclosure. As discussed previously with respect to process 800, in portal view, the AUI system 30 uses the position (e.g., location and orientation) of the display screen 160 to at least partially determine at least some of the parameters of the requested view.

Figure 13:
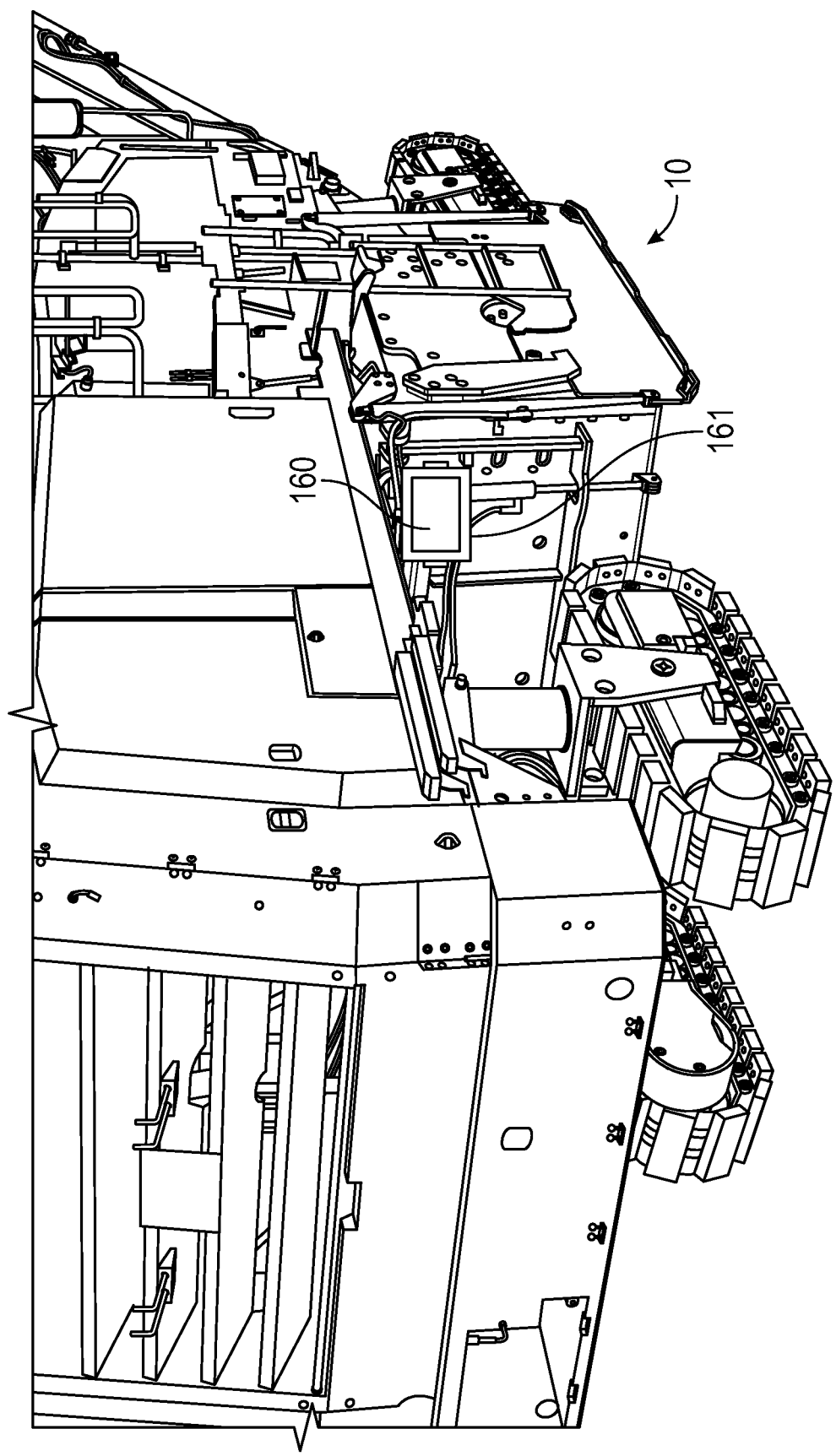
FIG. 13 shows a display screen mounted on a machine, according to an embodiment.

FIG. 13 shows a display screen 160 mounted on a side of the machine 10. The display screen may be mounted via an adjustable screen holder 161 connected to the machine 10 and in communication with at least the display system 34 of the AUI system 30. The display screen 160 (and holder 161) in FIG. 13 is located on the right side of the body of the machine at a height that may comfortably allow for a (standing) operator to hold and manipulate the screen 160. However, as described with respect to FIGS. 1-3, the display screen may be mounted to various parts of the machine and, in some embodiments, be physically detached from the machine (e.g., screen on a wireless device connected to the machine 10 via a local network).

Figure 14:
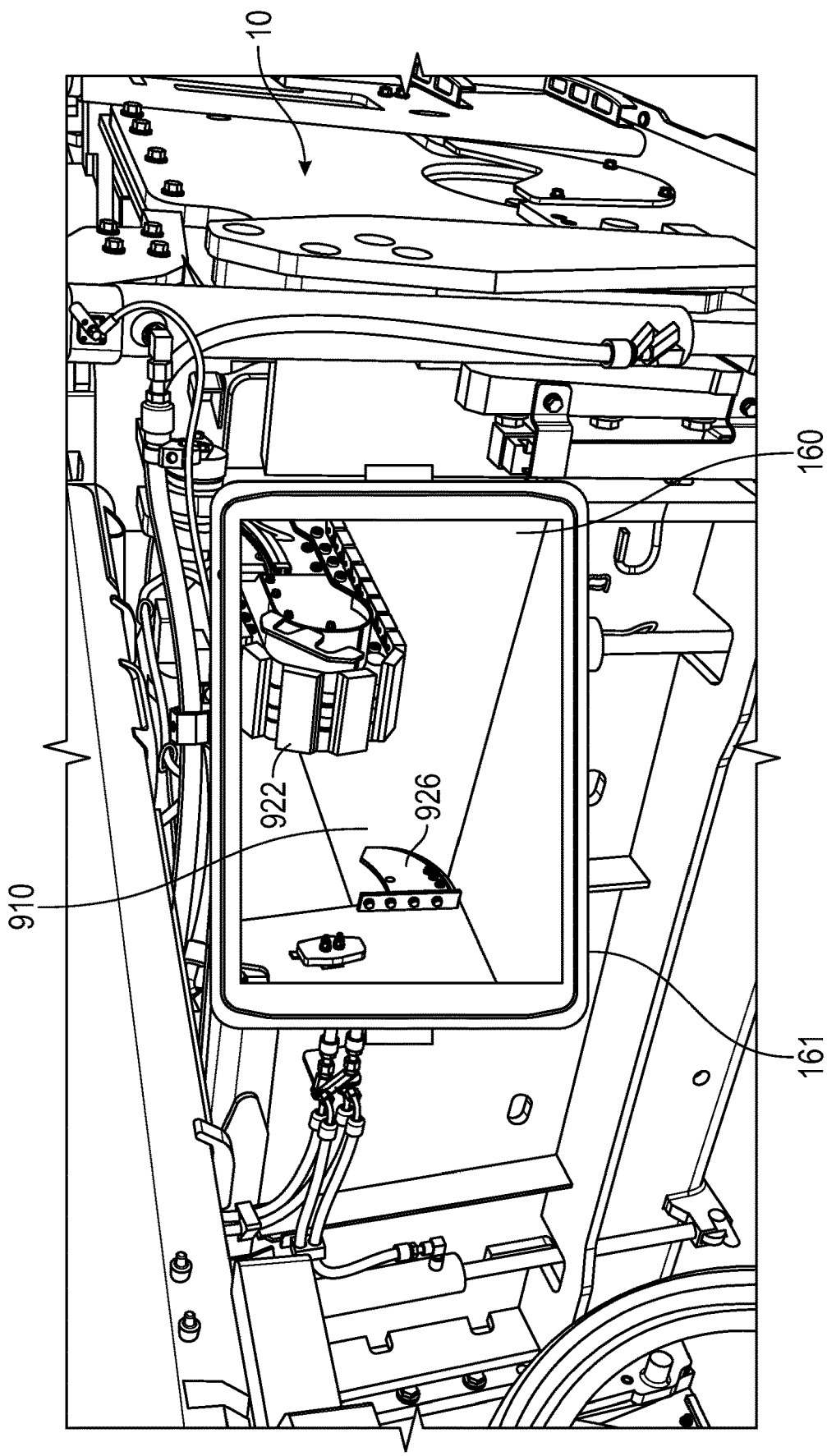
FIGS. 14-16 show the display screen of FIG. 13 being operated in a window mode, according to exemplary embodiments.

FIG. 14 shows the same machine 10, screen 160, and screen holder 161 as FIG. 13, with an augmented machine view displayed on the screen 160. The augmented machine view in FIG. 14 is a portal mode view where the screen 160 shows representations of parts of the machine (front left tracks 922 and left ski 926) that would be visible if the screen 160 were a window through the body of the machine 10, all the way to the other side.

The movement and location of virtual components of the machine (virtual left tracks 922 and left ski 926) shown on the screen 160 would correspond in real-time to the movement and location of actual components (left tracks and ski) of the machine 10. The camera image 910 is actual footage of the environment around the actual machine parts, collected by one or more cameras 150 located at that part of the machine 10 and processed by the vision system 32, as described with respect to process 800.

In the portal view of FIG. 14, the requested viewing angle (e.g., straight through the screen as if it were a window or portal), may be automatically calculated by the AUI system 30 using data from the display sensors 346 that are, for example, located in the adjustable screen holder 161 or the display screen 160.

Figure 15:
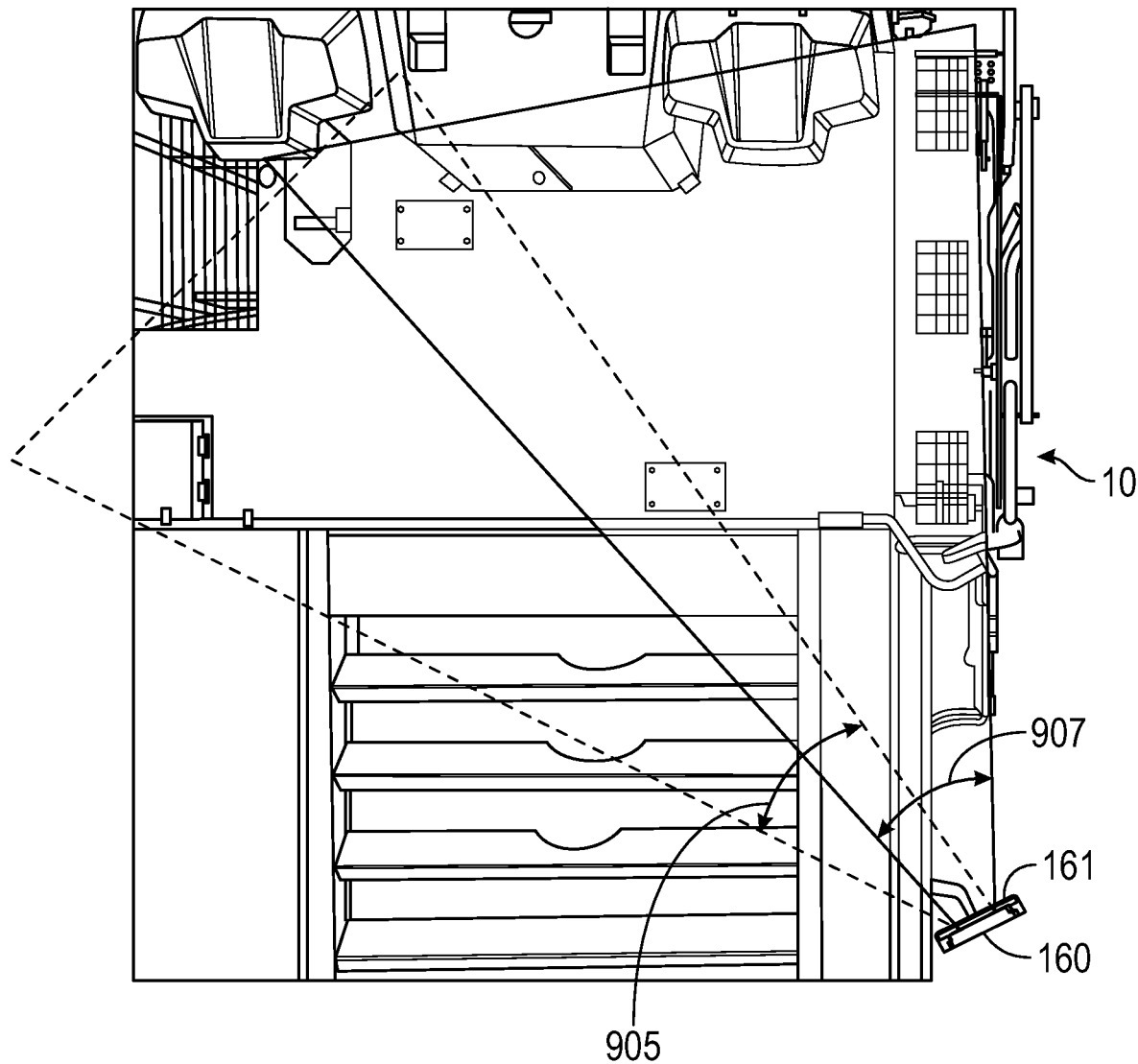

In some embodiments, while the screen is being operated in portal mode, the adjustable holder 161 with the screen 160 may be moved (e.g., shifted, rotated) by the operator to observe a different part of the machine 10. FIG. 15 shows a top view of the machine 10 and screen 160 from FIG. 14 as the screen is rotated right so that the screen's virtual field of view changes from a first field of view 905 (represented by dashed lines) to a second field of view 907 (represented by solid lines).

Figure 16:
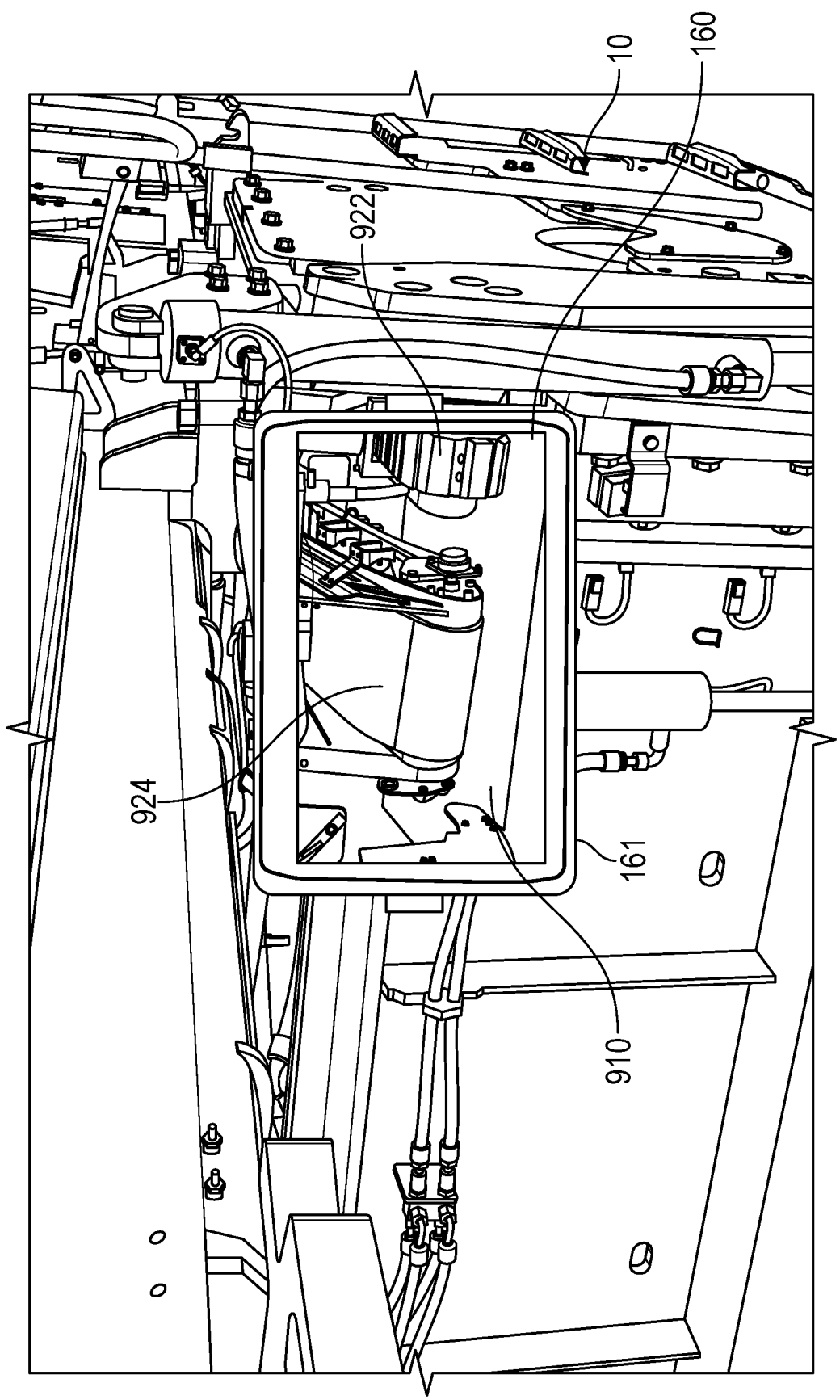

FIG. 16 shows the resulting screen 160 after it has been rotated to the second field of view 907, as shown in FIG. 15. The resulting augmented virtual machine view now shows a more central part of the virtual machine (including a bottom part of the virtual conveyor 925) and the camera footage 910 of the areas around the more central part of the machine. In other examples (not shown), the operator may inspect various other parts of the machine by pointing the screen 160, for example, towards the top of the conveyor to see how material is being unloaded, towards the rear part of the machine to observe operation of the back-left track, etc. The operator can also hide/strip out parts or sub-systems of the machine during the inspection, in order to more closely observe inner mechanical operations of machine sub-systems. In such a way, an operator could make real-time visual observations of a number of varied and distant parts of the machine 10, without having to physically walk or climb to those varied parts of the machine 10.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in a milling machine, it will be appreciated that it can be implemented in various other types of systems and machines with vision systems, and in various other environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. An augmented user interface (AUI) system of a machine comprising:
   a vision system having a plurality of cameras configured to capture footage of areas around the machine;
   a machine sensor system having a plurality of sensors mounted on the machine and configured to obtain measurements corresponding to movements of a plurality of machine parts; and
   a display system having at least one display screen, the display system configured to (i) generate a virtual machine model using the measurements, (ii) determine a position of the at least one display screen and (iii) display in real time an augmented machine view comprising the virtual machine model overlayed with the footage, wherein the augmented machine view comprises a specific portion of the virtual machine model and a virtual viewing angle of the machine, wherein the specific portion and the virtual viewing angle are based the position of the at least one display screen with respect to the machine.

2. The AUI system of claim 1, wherein the virtual machine model comprises a three-dimensional representation of the machine having movements of individual components of the virtual machine model correspond in real time to movements of individual actual components of the machine.

3. The AUI system of claim 2, wherein the position of the at least one display screen comprises a screen view angle that is perpendicular to the plane of the screen, and wherein the virtual viewing angle corresponds to the screen view angle.

4. The AUI system of claim 3, wherein the specific portion of the virtual machine model corresponds to portions of the machine physically located behind the display screen.

5. The AUI system of claim 1, wherein the display system comprises at least one display screen and one or more screen sensors, configured to monitor a position of the at least one display screen.

6. The AUI system of claim 1, wherein the display system comprises at least one display input device configured to allow a user to request a specific augmented machine view by selecting at least (i) one or more particular areas from the areas around the machine and (ii) one or more specific machine parts from the plurality of machine parts.

7. A machine having a body, the machine comprising:
   a plurality of cameras mounted on the body of the machine and configured to capture video of areas around the machine and transmit the video in real time;
   a plurality of machine actuator sensors configured to measure movement of one or more components of the machine; and
   an augmented user interface (AUI) system communicatively coupled to the machine including a display screen, wherein the AUI system is configured to (i) obtain a virtual model of the machine and (ii) display on the display screen, in real-time, the virtual machine model of the machine synched and overlayed with the video of the areas around the machine, wherein the display in real time comprises a specific portion of the virtual machine model and a virtual viewing angle of the machine, wherein the specific portion and the virtual viewing angle are based at least on a position of the display screen with respect to the machine.

8. The machine of claim 7, wherein the machine further comprises one or more display holders mounted on the machine, the display screen configured to attach to the one or more display holders.

9. The machine of claim 8, wherein the one or more display holders are configured to be shifted and rotated with respect to the machine.

10. The machine of claim 8, wherein the one or more display holder includes at least one sensor configured to monitor a position of an individual display holder of the one or more display holder when the display screen is attached to the individual display holder.

11. The machine of claim 10, wherein the at least one sensor is configured to communicate display holder position information to the AUI system.

12. A non-transitory computer-readable medium having instructions that, when executed by one or more processors, cause the one or more processors to:
- obtain at least one actuator sensor reading, the at least one actuator sensor reading indicative of movement of a machine component;
- based on the at least one actuator sensor reading, update a virtual machine model of the machine component, wherein a movement of the virtual machine model of the machine component corresponds in real time to the movement of the machine component;
- obtain a video stream of an area proximate to the machine component; and
- overlay the video stream with the virtual machine model of the machine component to generate a real-time augmented machine view, wherein the video stream and the virtual machine model of the machine component are synched together in time in the augmented machine view;
- display the augmented machine view on a display screen;
- prior to the obtaining the at least one actuator sensor reading, determine a position of the display screen; and
- based on the position of the display screen, identify the machine component.

13. The non-transitory computer-readable medium of claim 12, wherein the instructions, when executed by the processor, further cause the one or more processors to: receive a request for the augmented machine view, the request comprising at least an identification of the machine component and an identification of the area proximate to the machine component.

14. The non-transitory computer-readable medium of claim 13, wherein the request further comprises an identification of one or more machine sub-systems, wherein the augmented machine view is configured to hide the one or more machine sub-systems.

15. The non-transitory computer-readable medium of claim 13, wherein the instructions, when executed by the one or more processors, further cause the processor to: receive a second request for a second augmented machine view, the second request comprising at least an identification of a second machine component; and based on the receiving the second request, obtain at least one second actuator sensor reading, the at least one second actuator sensor reading indicative of movement of the second machine component.

16. The non-transitory computer-readable medium of claim 12, wherein the instructions, when executed by the processor, further cause the processor to: based on the position of the display screen, identify the area proximate to the machine component.

17. The non-transitory computer-readable medium of claim 12, wherein the instructions, when executed by the processor, further cause the processor to: determine a change to the position of the display screen; and based on the change, identify a second machine component.

* * * * *